United States Patent
Takahata et al.

(10) Patent No.: US 9,509,012 B2
(45) Date of Patent: Nov. 29, 2016

(54) LITHIUM ION SECONDARY BATTERY AND METHOD OF MANUFACTURING LITHIUM ION SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 217 days.

(21) Appl. No.: 14/130,713

(22) PCT Filed: Jul. 5, 2011

(86) PCT No.: PCT/JP2011/065367
§ 371 (c)(1),
(2), (4) Date: Jan. 3, 2014

(87) PCT Pub. No.: WO2013/005302
PCT Pub. Date: Jan. 10, 2013

(65) Prior Publication Data
US 2014/0141304 A1    May 22, 2014

(51) Int. Cl.
*H01M 4/96* (2006.01)
*H01M 10/04* (2006.01)
*H01M 10/0525* (2010.01)
*H01M 4/13* (2010.01)
*H01M 4/66* (2006.01)
*H01M 4/133* (2010.01)
*H01M 4/1393* (2010.01)
(Continued)

(52) U.S. Cl.
CPC ......... *H01M 10/0431* (2013.01); *H01M 4/13* (2013.01); *H01M 4/133* (2013.01); *H01M 4/1393* (2013.01); *H01M 4/661* (2013.01); *H01M 10/0525* (2013.01); *H01M 10/0585* (2013.01); *H01M 2004/021* (2013.01); *Y02E 60/122* (2013.01); *Y02P 70/54* (2015.11); *Y02T 10/7011* (2013.01); *Y10T 29/49115* (2015.01)

(58) Field of Classification Search
CPC ...... H01M 4/13; H01M 4/661; H01M 4/133; H01M 4/1393
See application file for complete search history.

(56) References Cited

U.S. PATENT DOCUMENTS

| 2004/0072076 A1 | 4/2004 | Matsubara et al. |
| 2007/0148550 A1 | 6/2007 | Hasegawa et al. |
| 2013/0157090 A1 | 6/2013 | Kuroda |

FOREIGN PATENT DOCUMENTS

| CN | 101662014 A | 3/2010 |
| JP | H09-245770 A | 9/1997 |

(Continued)

OTHER PUBLICATIONS

Office Action issued in U.S. Appl. No. 14/235,471 dated May 18, 2016.

(Continued)

*Primary Examiner* — Nicholas P D'Aniello
(74) *Attorney, Agent, or Firm* — Finnegan, Henderson, Farabow, Garrett & Dunner, LLP

(57) ABSTRACT

In a lithium ion secondary battery, a negative electrode sheet is made of a metal foil and an active material layer containing active material particles. The negative active material layer includes a facing portion that faces a positive active material layer and a non-facing portion that does not face the same. The negative active material particles can be oriented in a magnetic field direction. When an angle between an extending direction of a major axis of the cross section of each particle and the metal foil is θ, the number of particles with the angle θ of 60°-90° is MA, the number of negative active material particles with the angle θ of 0°-30° is MB, and a value MA/MB is assumed to be an orientation degree (AL) of particles, the negative active material layer is made such that an orientation degree (AL1) in the non-facing portion is 1.2 or more.

2 Claims, 7 Drawing Sheets

(51) Int. Cl.
 *H01M 10/0585* (2010.01)
 *H01M 4/02* (2006.01)

(56) References Cited

FOREIGN PATENT DOCUMENTS

| JP | 2002-231316 | 8/2002 |
| JP | 2003-197182 A | 7/2003 |
| JP | 2003-197189 | 7/2003 |
| JP | 2004-220926 | 8/2004 |
| JP | 2007-200862 A | 8/2007 |
| JP | 2010-108716 | 5/2010 |
| JP | 2013-12320 | 1/2013 |
| WO | WO 2012/029144 | 3/2012 |

OTHER PUBLICATIONS

Notice of Allowance issued in U.S. Appl. No. 14/235,471 on Sep. 14, 2016.

LITHIUM ION SECONDARY BATTERY AND METHOD OF MANUFACTURING LITHIUM ION SECONDARY BATTERY

CROSS-REFERENCE TO RELATED APPLICATIONS

This is a national phase application based on the PCT International Patent Application No. PCT/JP2011/065367 filed on Jul. 5, 2011, the entire contents of which are incorporated herein by reference.

TECHNICAL FIELD

The present invention relates to a lithium ion secondary (rechargeable) battery including an electrode body, a battery case, and an electrolyte, and a method for manufacturing this lithium ion secondary battery.

BACKGROUND ART

In recent years, chargeable and dischargeable lithium ion secondary batteries (hereinafter, also referred to as batteries) are utilized as drive power sources of vehicles such as a hybrid vehicle and an electric vehicle, and portable electronic devices such as a note-sized personal computer and a video camcorder. As one example of such batteries, Patent Document 1 discloses a battery made by using 88 weight % of low crystallinity carbon having a lattice place facing (d002) of 0.38 as a negative active material, 4 weight % of vapor phase carbon fiber having a higher conductivity than the constant crystallinity carbon as a conductive material, and an electrolyte containing $LiPF_6$ being solved with a 0.8 mol/l concentration.

RELATED ART DOCUMENTS

Patent Documents

Patent Document 1: JP-A-2002-231316

SUMMARY OF INVENTION

Problems to be Solved by the Invention

However, a positive active material layer expands when a battery is discharged at a relatively large current, e.g., 10 C or more (high-rate discharge), while a negative active material layer expands when the battery is charged at a relatively large current (high-rate charge). In the battery disclosed in Patent Document 1 containing the electrolyte, part of the electrolyte (concretely, the electrolyte retained between a positive active material layer of a positive electrode sheet and a negative active material layer of a negative electrode sheet (hereinafter, also referred to as a retained electrolyte)) may be pushed out of an electrode body. Thus, a liquid amount of the retained electrolyte retained in the electrode body decreases and thus battery reaction is not easily generated, thereby increasing an internal resistance of the battery.

Furthermore, in a battery containing a stored electrolyte stored in a battery case in addition to the above retained electrolyte so that the retained electrolyte and the stored electrolyte are allowed to interact with each other, the concentration of the retained electrolyte may gradually change (increase or decrease) by a difference between the lithium ion concentration in the pushed-out electrolyte and the lithium ion concentration of the stored electrolyte. Accordingly, the battery reaction in the electrode body may not be smoothly advanced, resulting in an increase in battery internal resistance.

The present invention has been made to solve the above problems and has a purpose to provide a lithium ion secondary battery configured to restrain a retained electrolyte from being pushed out of an electrode body during high-rate charge and discharge, and a method for manufacturing the lithium ion secondary battery.

Means of Solving the Problems

To achieve the above purpose, one aspect of the invention provides a lithium ion secondary battery including: an electrode body including: a negative electrode sheet including a negative metal foil and a negative active material layer formed on the negative metal foil, the negative active material layer containing negative active material particles; a positive electrode sheet including a positive metal foil and a positive active material layer formed on the positive metal foil; and separators interposed between the positive electrode sheet and the negative electrode sheet; a battery case housing the electrode body; and an electrolyte accommodated in the battery case, the electrolyte containing lithium ions, the electrolyte including a retained electrolyte retained between the positive electrode sheet and the negative electrode sheet of the electrode body, the negative active material layer having a facing portion placed to face the positive active material layer of the positive electrode sheet adjacent through the separators and a non-facing portion placed outside the facing portion without facing the positive active material layer, wherein the negative active material particles are flat-shaped particles containing graphite and being able to be oriented by a magnetic field, when particle cross sections of 100 or more of the negative active material particles in a vertical cross section of the negative electrode sheet is observed through a scanning electron microscope (SEM), an angle formed between an extending direction of a major axis of the particle cross section and the negative metal foil is assumed as θ, of the observed negative active material particles, a number of the negative active material particles having the angle θ of 60° to 90° is assumed as MA, a number of the negative active material particles having the angle θ of 0° to 30° is assumed as MB, and a value obtained by dividing the number MA by the number MB (=MA/MB) is assumed as an orientation degree AL of the negative active material particles, the negative active material layer is configured such that a non-facing portion orientation degree AL1 which is the orientation degree AL of the negative active material particles in the non-facing portion is 1.2 or higher, wherein the facing portion of the negative active material layer is configured such that a facing portion orientation degree AL2 which is the orientation degree AL in the facing portion is 0.8 or less.

In the above battery, the non-facing portion orientation degree AL1 of the negative active material particles in the non-facing portion of the negative active material layer is set to 1.2 or larger. That is, in the non-facing portion, most of the flat-shaped negative active material particles are oriented at a large angle, close to 90°, i.e., in standing position, with respect to the negative metal foil. Accordingly, these negative active material particles in the non-facing portion can restrain the retained electrolyte from being pushed out of the electrode body during high-rate charge and discharge of the battery. In the above battery, the facing portion orientation degree AL2 of the negative active material particles in the facing portion of the negative active material layer is set to 0.8 or less. Specifically, as compared to the non-facing portion, the facing portion contains more negative active material particles having a small angle close to 0°, i.e., in lying position with respect to the negative metal foil, of the flat-shaped negative active material particles. Thus, the battery can be configured to prevent deposition of lithium metal under a low temperature environment. This is because graphite particles have a (micaceous) crystal structure in which a plurality of basal planes each consisting of carbon atoms arranged in planar form are laminated, and take a flat-shaped particle form having main front and back faces parallel to the basal planes. In the flat-shaped graphite particles, specifically, most of the main faces (front and back faces) are conceived as being parallel to the basal planes. Accordingly, when the flat-shaped negative active material particles are oriented in lying position, the projecting area of the basal planes of graphite seen from the positive electrode sheet can be made larger and the negative active material particles can receive more lithium ions through the basal planes. Therefore, it is conceived that, when a battery is charged at a relatively large current, e.g., 30 C, for a short period under a low temperature environment (−15° C.), lithium ions can be inserted appropriately in the negative active material particles and deposition of lithium metal in the negative active material layers can be restrained.

It is to be noted that the negative active material particles are flat-shaped particles containing graphite and being able to be oriented by a magnetic field (magnetic field orientation). For instance, the particles may be graphite particles having high crystal anisotropy and a diamagnetic magnetic field orientation property, and being able to change orientation by a magnetic field, such as natural graphite including flake graphite, vein graphite, etc., artificial graphite, and spherical graphite (having a nearly spherical shape as a whole by processing edges of flat-shaped natural graphite but having a flat shape in the center of each particle). Furthermore, for example, the particles may be flat-shaped composite particles composed of the above graphite particles and amorphous carbon covering each surface of the particles.

The electrode body may include a wound electrode body formed of a strip-shaped positive electrode sheet and a strip-shaped negative electrode sheet wound together by interposing strip-shaped separators and a laminated electrode body formed of a plurality of positive electrode sheets and a plurality of negative electrode sheets are alternately laminated by interposing separators.

The configuration of accommodating the electrolyte in the battery case may include a configuration that part of the electrolyte is retained as a retained electrolyte between the positive electrode sheet and the negative electrode sheet of the electrode body, while the remaining is stored as a stored electrolyte in the battery case so as to interact with each other. Alternatives may also be configured such that, for instance, the electrolyte is all retained as the retained electrolyte between the positive electrode sheet and the negative electrode sheet of the electrode body or part of the electrolyte is the retained electrolyte and the remaining is stored in the battery case but in a small amount so as not to interact with the retained electrolyte with each other, different from the above stored retained electrolyte.

Furthermore, another aspect of the invention provides a method for manufacturing a lithium ion secondary battery including: an electrode body including: a negative electrode sheet including a negative metal foil and a negative active material layer formed on the negative metal foil, the negative active material layer containing negative active material particles; a positive electrode sheet including a positive metal foil and a positive active material layer formed on the positive metal foil; and separators interposed between the positive electrode sheet and the negative electrode sheet; a battery case housing the electrode body; and an electrolyte accommodated in the battery case, the electrolyte containing lithium ions, the electrolyte including a retained electrolyte retained between the positive electrode sheet and the negative electrode sheet of the electrode body, the negative active material layer having a facing portion placed to face the positive active material layer of the positive electrode sheet adjacent through the separators and a non-facing portion placed outside the facing portion without facing the positive active material layer, wherein the negative active material particles are flat-shaped particles containing graphite and being able to be oriented by a magnetic field, when particle cross sections of 100 or more of the negative active material particles in a vertical cross section of the negative electrode sheet is observed through a scanning electron microscope (SEM), an angle formed between an extending direction of a major axis of the particle cross section and the negative metal foil is assumed as θ, of the observed negative active material particles, a number of the negative active material particles having the angle θ of 60° to 90° is assumed as MA, a number of the negative active material particles having the angle θ of 0° to 30° is assumed as MB, and a value obtained by dividing the number MA by the number MB (=MA/MB) is assumed as an orientation degree AL of the negative active material particles, the negative active material layer is configured such that a non-facing portion orientation degree AL1 which is the orientation degree AL of the negative active material particles in the non-facing portion is 1.2 or higher, wherein the facing portion of the negative active material layer is configured such that a facing portion orientation degree AL2 which is the orientation degree AL in the facing portion is 0.8 or less, and wherein, the method includes: an applying step of applying active material paste containing the negative active material particles dispersed in a solvent to a main surface of the negative metal foil to form a coating; an orientation step of applying a magnetic field to a prospective non-facing portion of the coating, which will be the non-facing portion of the negative active material layer, to orient the negative active material particles contained in the prospective non-facing portion by a magnetic field; and a drying step of drying the coating after the orientation step, and the orientation step including applying the magnetic field to the prospective non-facing portion of the coating without applying the magnetic field to a prospective facing portion which will be the facing portion of the negative active material layer.

In the orientation step of the above battery manufacturing method, the magnetic field is applied to the prospective non-facing portion (i.e., the portion to be formed as the non-facing portion), thereby orienting the negative active material particles in the prospective non-facing portion by the magnetic field. In the drying step, further, the coating is dried. Accordingly, the battery can be easily manufactured in which the non-facing portion orientation degree AL1 of the negative active material particles in the non-facing portion of the negative electrode sheet (the negative active material layer) is 1.2 or higher. In the orientation step of the above battery manufacturing method, the magnetic field is applied to the prospective non-facing portion, not to the prospective facing portion. Accordingly, the battery can be easily and reliably manufactured such that the orientation degree of the facing portion (the above facing portion orientation degree AL2) is not increased but the non-facing portion orientation degree AL1 of the non-facing portion is increased.

A device to be used to thy the coating may include for example a heater using hot air, infrared rays, electromagnetic induction heating (IH), and condenser drier. Of them, the infrared rays, the electromagnetic induction heating (IH), and the condenser drier can dry the coating without blowing air thereto. Accordingly, the drying step of drying the coating by using the infrared rays, the electromagnetic induction heating (IH), or the condenser drier, without blowing air, is more preferable because it can dry the coating without disturbing the orientation of the negative active material particles. The term "without blowing air" means that the atmosphere is not forcibly moved by a fan or the like that injects hot air to the coating. Air movement by natural convection associated with heating or the like is allowed.

REFERENCE SIGNS LIST

Figure 1:
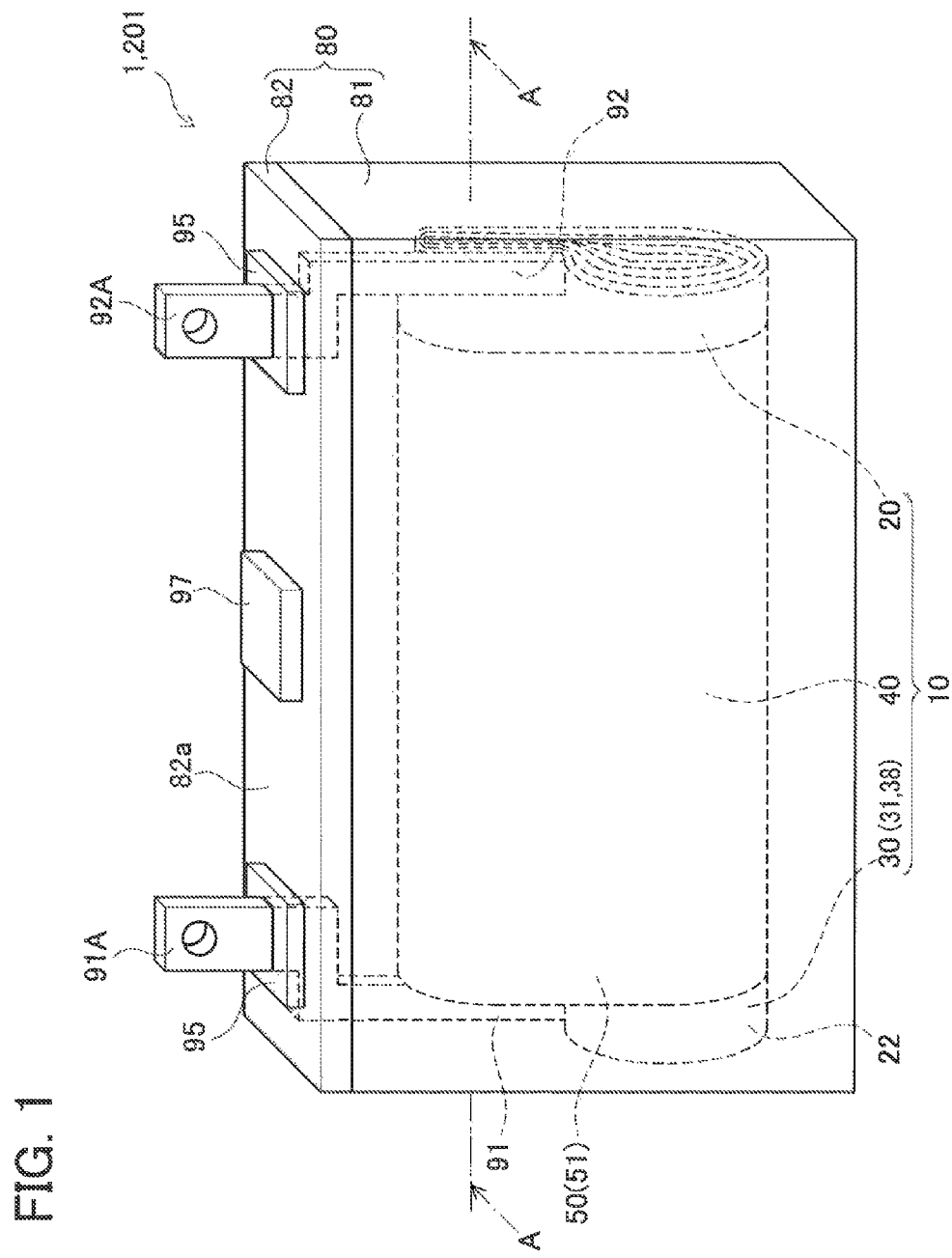
FIG. 1 is a perspective view of a lithium ion secondary battery in an embodiment (Example 1) and a modified example.

1 Battery (Lithium ion secondary battery)
10 Electrode body
20 Negative electrode sheet
21 Negative active material layer
21P Active material paste
21S Coating
21X Facing portion
21XB Prospective facing portion
21Y Non-facing portion
21YB Prospective non-facing portion
22 Negative active material particles
22F Particle cross-section
28 Copper foil (Negative metal foil)
28A Foil main surface (Main surface (of Negative metal))
30 Positive electrode sheet
31 Positive active material layer
38 Aluminum foil (Positive metal foil)
40 Separator
50 Electrolyte
51 Retained electrolyte
80 Battery case
θ Angle
AL Orientation degree
AL1 Non-facing portion orientation degree
AL2 facing portion orientation degree
H Magnetic field
LR Major axis
Q Solvent

MODE FOR CARRYING OUT THE INVENTION

Embodiment

In a battery of a present embodiment of the present invention, a detailed description of a battery of Example 1 will now be given referring to the accompanying drawings.

A lithium ion secondary battery 1 of Example 1 is first explained referring to FIG. 1. This battery 1 includes an electrode body 10, a battery case 80 in which the electrode body 10 is housed, and an electrolyte 50 accommodated in this battery case 80 (see FIG. 1). The electrode body 10 consists of a positive electrode sheet 30, a negative electrode sheet 20, and separators 40, each of which has a strip-like shape, in a wound form that the positive electrode sheet 30 and the negative electrode sheet 20 are wound together by interposing the separators 40 therebetween.

The battery case 80 includes a case body 81 and a closing lid 82, each of which is made of aluminum. The case body 81 has a bottom-closed rectangular box-like shape. Between this battery case 80 and the electrode body 10, an insulation film (not shown) made of resin and folded like a box is interposed. The closing lid 82 has a rectangular plate-like shape and is welded to the case body 81 to close the opening of the case body 81. Through this closing lid 82, a positive terminal portion 91A formed at a leading end of a positive current collecting member 91 and a negative terminal portion 92A formed at a leading end of a negative current collecting member 92 are placed to extend, protruding out from a lid surface 82a in FIG. 1. Each of the current collecting members 91 and 92 is connected to the electrode body 10. Between the closing lid 82 and each of those positive terminal portion 91A and negative terminal portion 92A, an insulation member 95 made of insulating resin is placed to insulate them from each other. Further, a rectangular-plate-shaped safety valve 97 is also sealingly attached to the closing lid 82.

Figure 2:
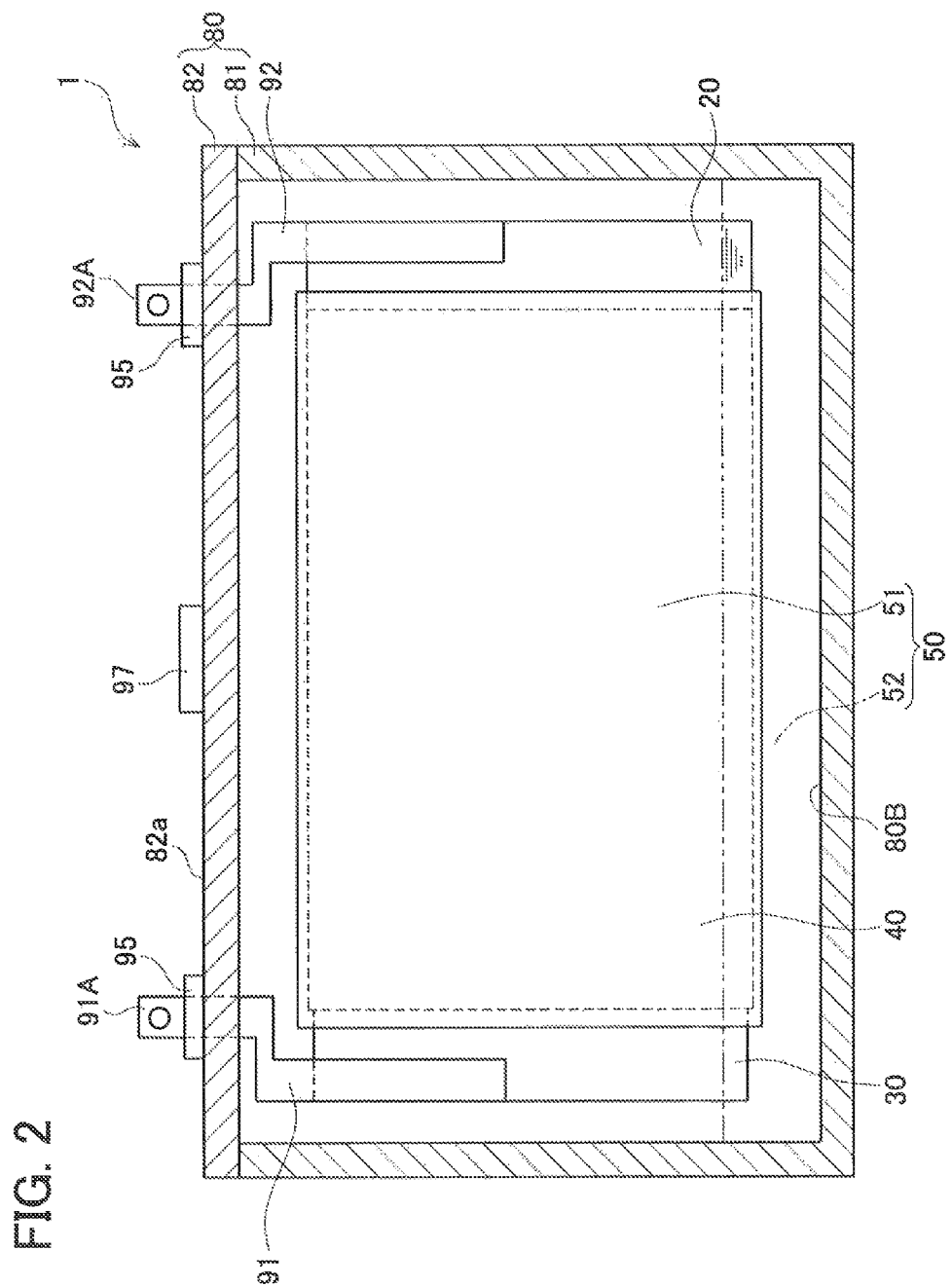
FIG. 2 is a cross sectional view (taken along a line A-A in FIG. 1) of the lithium ion secondary battery in the embodiment (Example 1)

The electrolyte 50 is a nonaqueous electrolyte prepared by adding $LiPF_6$ to a mixed organic solvent to provide a lithium ion concentration of 1 mol/l. In Example 1, this electrolyte 50 is classified by difference in retaining section. Specifically, in the electrode body 10, the electrolyte retained between the positive electrode sheet 30 and the negative electrode sheet 20 is referred to as a retained electrolyte 51. On the other hand, the electrolyte stored in the battery case 80 (concretely, a lower part 80B in the battery case 80) to be allowed to interact with the retained electrolyte 51 as shown in FIG. 2 is referred to as a stored electrolyte 52. This stored electrolyte 52 is generated when the electrolyte 50 is poured in the battery case 80 in an amount more than that to be retained in the electrode body 10.

The electrode body 10 is a wound electrode body consisting of the positive electrode sheet 30, the negative electrode sheet 20, and the separators 40 that are wound together in a flat shape as shown in FIG. 1. These positive electrode sheet 30 and negative electrode sheet 30 of the electrode body 10 are respectively joined to the positive current collecting member 91 and the negative current collecting member 92, each of which has a plate-like shape bent in crank form (see FIG. The porous separators 40 made of polyethylene are impregnated with and retain the above electrolyte 50 (the retained electrolyte 51), and serve to separate the positive electrode sheet 30 and the negative electrode sheet 20.

The positive electrode sheet 30 consists of a strip-shaped aluminum foil 38 made of aluminum, and two positive active material layers 31, 31 each formed in a strip shape on both main surfaces of the aluminum foil 38. Each positive active material layer 31 contains $LiNi_{1/3}Co_{1/3}Mn_{1/3}O_2$ as positive active material particles, acetylene black (AB) as a conductive material, and polyvinylidene fluoride (PVDF) as a binding material.

Figure 3:
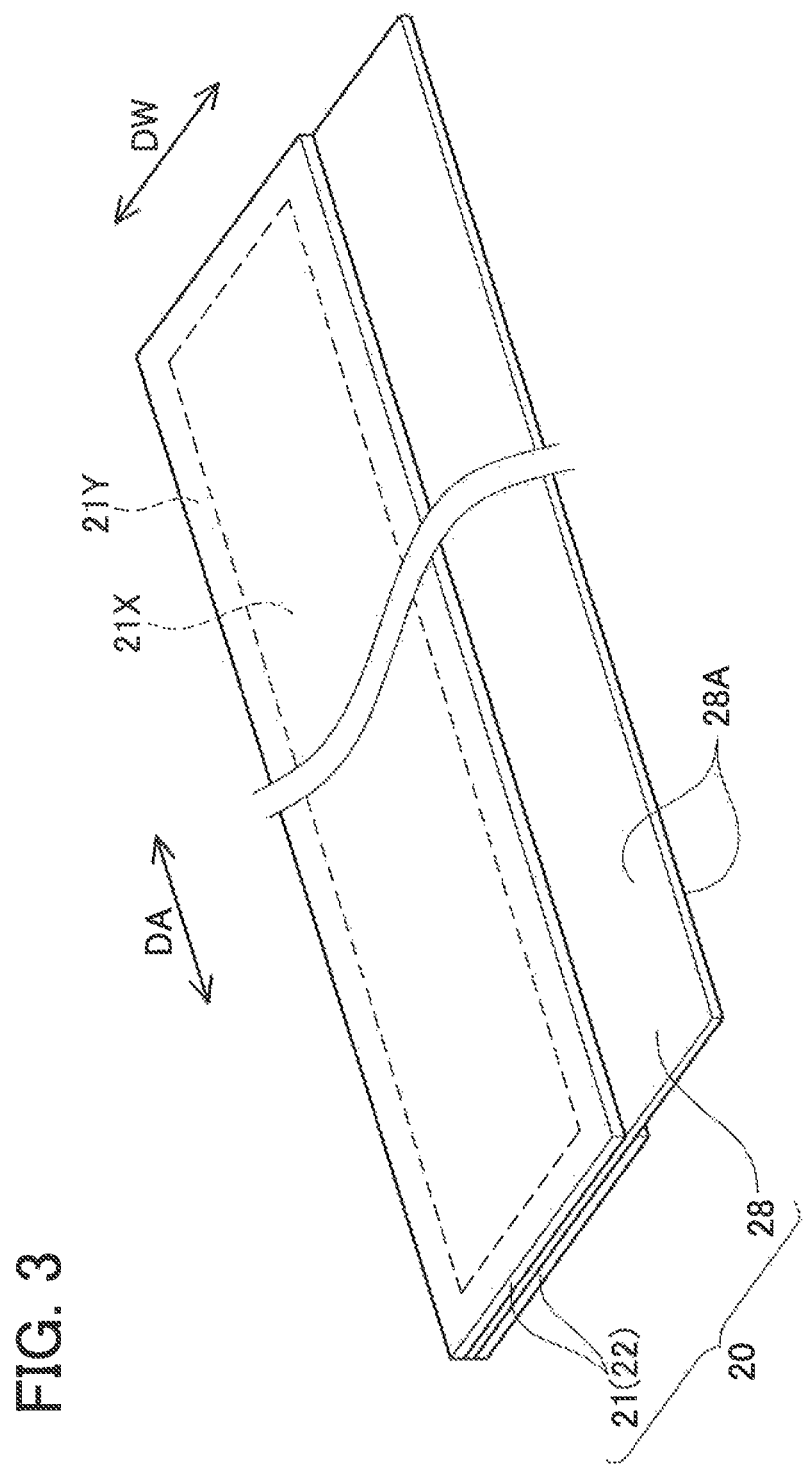
FIG. 3 is a perspective view of a negative electrode sheet in the embodiment (Example 1) and the modified example.

As shown in a perspective view of FIG. 3, the negative electrode sheet 20 consists of a copper foil 28 made of copper in a strip shape extending in a longitudinal direction DA, and two negative active material layers 21, 21 each formed in a strip shape on both main surfaces 28A, 28A of the copper foil 28. Each negative active material layer 21 contains negative active material particles 22 made of flat-shaped composite particles (an average particle diameter: 10 μm) composed of spherical graphite (spheroidized graphite) particles whose surfaces are coated with amorphous carbon, and further contains carboxymethyl cellulose (CMC) and styrenebutadiene rubber (SBR). The composite particles constituting the negative active material particles 22 are flat-shaped particles composed of spherical graphite and amorphous carbon coating the surface thereof, the spherical graphite having a nearly spherical shape as a whole by processing edges of flat-shaped natural graphite, but having a flat shape in the center of each particle.

Of the negative active material particles 22, the amorphous carbon is low in crystal anisotropy (high in isotropy) and has no magnetic field orientation property. On the other hand, the spherical graphite constituting the negative active material particles 22 (composite particles) is made of natural graphite as mentioned above and thus, as with natural graphite, is high in crystal anisotropy and has a diamagnetic magnetic field orientation property and a property of being changeable in orientation by a magnetic field. Accordingly, the negative active material particles 22 are particle that can be oriented by a magnetic field.

In the battery 1 of Example 1, furthermore, to prevent deposition of metallic lithium near the edges of the negative active material layers 21 in the width direction during charge, the negative active material layers 21 are formed larger than the positive active material layers 31 so that the negative active material layers 21 cover the positive active material layers 31 by interposing the separators 40.

To be concrete, as shown in FIG. 3, each negative active material layer 21 includes a rectangular facing portion 21X located at the center of each negative active material layer 21 in the longitudinal direction DA and a width direction DW and a rectangular frame-shaped non-facing portion 21Y located on an outer circumferential side (in the longitudinal direction DA and the width direction DW) around the facing portion 21X. The facing portions 21X face the positive active material layers 31 of the adjacent positive electrode sheets 30 through the separators 40 in the electrode body 10 of the battery 1 and the non-facing portions 21Y do not face the positive active material layers 31 in the electrode body 10.

In the battery 1 of Example 1, the non-facing portion 21Y and the facing portion 21X of each negative active material layer 21 are formed with different orientation degrees AL of the negative active material particles 22 from each other. To be concrete, in the non-facing portion 21Y, a non-facing portion orientation degree AL1, which is the orientation degree AL of the negative active material particles 22, is set to 1.5. In the facing portion 21X, a facing portion orientation degree AL2, which is the orientation degree AL of the negative active material particles 22, is set to 0.8 or less (concretely, 0.6).

Figure 4:
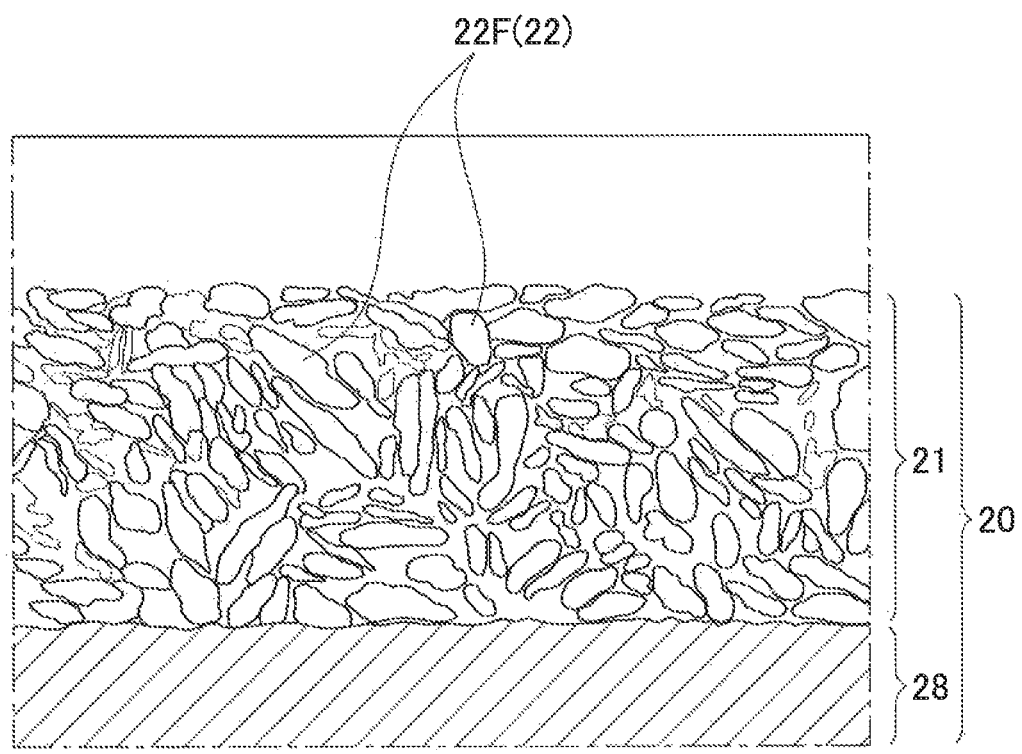
FIG. 4 is an enlarged diagram of a longitudinal cross-section of the negative electrode sheet photographed with an SEM.

The orientation degree AL of the negative active material particles 22 is calculated as below. Specifically, particle cross sections 22F, 22F of hundreds or more of the negative active material particles 22, 22 in a vertical cross section of the negative electrode sheet 20 are observed with a SEM (see FIG. 4). Each of the negative active material particles 22, 22 observed is subjected to measurement of an angle θ formed between an extending direction DR of the major axis of each of the particle cross sections 22F, 22F and the copper foil 28. The number of negative active material particles having the particle cross sections with the angle θ falling within a range of 60° to 90° is assumed as MA. On the other hand, the number of negative active material particles having particle cross sections with the angle θ falling within a range of 0° to 30° is assumed as MB. A value obtained by dividing MA by MB (=MA/MB) is assumed as an orientation degree AL.

Figure 5:
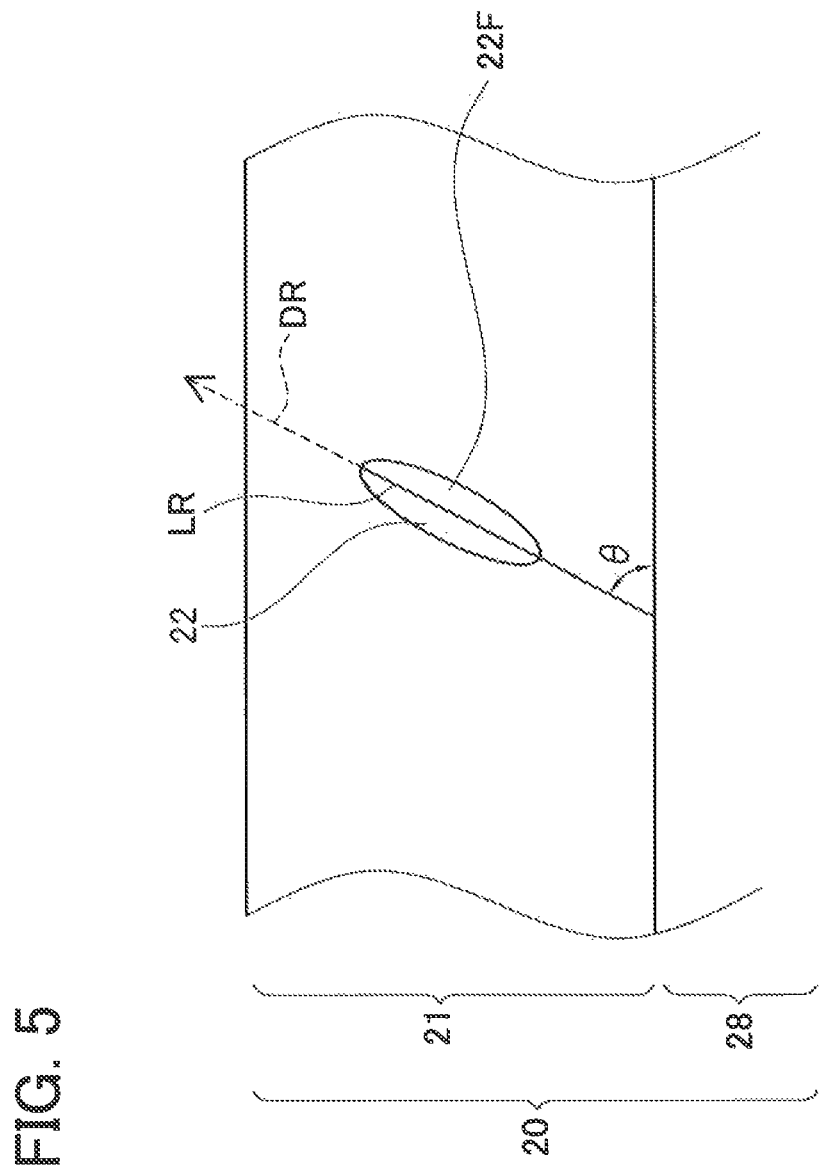
FIG. 5 is a schematic diagram showing the longitudinal cross-section of the negative electrode sheet.

The angle θ and the measurement thereof will be explained referring to a schematic diagram of FIG. 5. Since the aforementioned composite particles constituting the negative active material particles 22 each have a flat shape, most of the particle cross sections 22F of the negative active material particles 22 appear as a flat shape shown in FIG. 5. In each particle cross section 22F, the major axis LR exists. Therefore, the angle formed between the extending direction DR of the major axis LR of this particle cross section 22F and the copper foil 28 is assumed as an angle θ (see FIG. 5). As a method for specifying this angle θ, there is used herein a method for measuring an angle θ formed between the copper foil 28 and a straight line extended from the major axis LR of the observed particle cross section 22F of each active material particle 22 to the copper foil 28 side (downward in FIG. 4) in the figure.

The orientation degree AL exceeding 1.0 indicates MA>MB, that is, shows that the number of negative active material particles having the particle cross sections with the angle θ falling within a range of 60° to 90° is larger than the number of negative active material particles having the particle cross sections with the angle θ falling within a range of 0° to 30°.

From the value of the non-facing portion orientation degree AL1 (=15) of the negative active material particles 22 in the battery 1 of Example 1, it is found that most of the negative active material particles 22 in the non-facing portion 21Y are oriented in standing position with respect to the copper foil 28. On the other hand, from the value of the facing portion orientation degree AL2 (=0.6), it is found that most of the negative active material particles 22 in the facing portion 21X are oriented in lying position close to parallel with respect to the copper foil 28.

When the negative active material particles 22 are applied to the copper foil 28 and dried without subjected to magnetic field orientation, it is known that the orientation degree AL (AL1, AL2) of this negative active material layer is 0.8 or less (0.6 in Example 1).

Meanwhile, the inventors of the present application performed a test on the battery 1 of Example 1 using the aforementioned negative electrode sheet 20 by repeating high-rate discharge and checked the changes in internal resistance of the battery 1.

The internal resistance of the battery 1 was first measured. To be concrete, the battery 1 with a state of charge (SOC) adjusted in advance to SOC 60% was subjected to constant current discharge at 30 C under a temperature environment of 25° C., and then the voltage for this constant current discharge after a lapse of 10 seconds from the start of discharge was measured. The measured voltage is plotted in a graph indicating voltage in a vertical axis and constant current discharge in a horizontal axis. Then, a value of internal resistance (an untested (before-test) internal resistance R1) of the battery 2 was calculated from the inclination of a straight line connecting this point and the origin.

After measurement of internal resistance, the battery 1 charged and adjusted to SOC60% was subjected to discharge for 10 seconds at a current of 30 C (high-rate discharge) and charge for 1 minutes at a current of 5 C (capacity regulating charge), which were alternately repeated 4000 times under a temperature environment of 25° C. It is to be noted that a halt or break period of 10 minutes was placed between the high-rate discharge and the capacity regulating charge. After each of the capacity regulating charge of 500 times, 1000 times, and 1500 times, charge or discharge was conducted to adjust the battery 1 to SOC60%. Thereafter, the internal resistance value (a posttest (after-test) internal resistance value R2) of the battery 1 was measured (calculated) by the aforementioned method.

By using the untested internal resistance value R1 and the posttest internal resistance value R2, an internal resistance change rate of the battery 1 before and after the test (i.e., a value obtained by subtracting 1 from a value calculated by dividing the posttest internal resistance value R2 by the untested internal resistance value R1) was calculated. This internal resistance change rate of the battery 1 is listed in Table 1.

TABLE 1

| | Orientation Degree of Non-facing Portion AL1 | Orientation Degree of Facing Portion AL2 | Change Rate of Internal Resistance | | Capacity Retention Rate (%) | |
|---|---|---|---|---|---|---|
| Ex. 1 (Battery 1) | 1.5 | 0.8 or less (0.6) | 0.05 | ○ | 99.97 | ○ |
| Ex. 2 | 1.2 | 0.8 or less (0.4) | 0.08 | ○ | 99.98 | ○ |
| Ex. 3 | 1.6 | 0.8 or less (0.5) | 0.05 | ○ | 99.96 | ○ |
| Ex. 4 | 2.2 | 0.8 or less (0.5) | 0.02 | ○ | 99.97 | ○ |
| Ex. 5 | 2.5 | 0.8 or less (0.7) | 0.02 | ○ | 99.96 | ○ |
| Referential Example | 1.5 | 1.3 | 0.06 | ○ | 98.23 | X |
| CEx. 1 | 0.8 or less (0.6) | 0.8 or less (0.6) | 0.31 | X | 99.94 | ○ |
| CEx. 2 | 1.0 | 0.8 or less (0.6) | 0.18 | X | 99.97 | ○ |
| CEx. 3 | 0.8 or less (0.6) | 1.2 | 0.28 | X | 97.86 | X |
| CEx. 4 | 0.8 or less (0.6) | 2.2 | 0.22 | X | 96.32 | X |

Ex.: Example,
CEx.: Comparative Example

On the other hand, batteries of Examples 2 to 5, Referential Example, and Comparative examples 1 to 4 were prepared and subjected to measurement (calculation) of respective change rates of the battery internal resistance in the same manner as the battery 1 of Example 1. Each of the batteries of Examples 2 to 5 and Comparative examples 1 and 2 is identical in structure to the battery 1 of Example 1 excepting the value of non-facing portion orientation degree AL1 as shown in Table 1. The battery of Referential Example is identical in structure to the battery 1 of Example 1 excepting the value of the facing portion orientation degree AL2. The batteries of Comparative examples 3 and 4 are designed with the value of non-facing portion orientation degree AL1 of 0.8 or less.

Table 1 also shows the change rate of the internal resistance of each battery of the Examples 2 to 5, Referential Example, and Comparative examples 1 to 4 having been subjected to the high-rate discharge test.

In Table 1, the battery having an internal resistance change rate of less than 0.10, i.e., the battery having an internal resistance hardly increased before and after the test performed by repeatedly high-rate discharge, is evaluated with a mark "O" and the battery having an internal resistance change rate of 0.10 or higher is evaluated with a mark "X".

According to Table 1, regarding the internal resistance change rate, all the batteries of Comparative examples 1 to 4 are evaluated as being bad (X), whereas all the batteries of Examples 1 to 5, Referential Example are evaluated as being good (O). This result reveals that each battery of Examples 1 to 5, Referential Example having the non-facing portion orientation degree AL1 of 1.2 or higher hardly increases the internal resistance before and after high-rate discharge even when the high-rate discharge is repeated.

This is conceivably because the non-facing portion orientation degree AL1 in the non-facing portion is set to 1.2 or higher and the flat-shaped negative active material particles 22 are made in standing position with respect to the copper foil 28, so that the retained electrolyte could be prevented from being pushed out of the electrode body even when high-rate discharge was performed. Specifically, it is conceivable that it is possible to prevent such a situation that the retained electrolyte with the lithium ion concentration increased according to high-rate discharge is pushed out and mixed into the stored electrolyte, while the stored electrolyte having a lower lithium ion concentration than the pushed-out retained electrolyte is returned as the retained electrolyte into the electrode body, causing a gradual decrease in lithium ion concentration of the retained electrolyte.

As above, in each battery (battery 1) of Examples 1 to 5 in the present embodiment, the non-facing portion orientation degree AL1 of the negative active material particles 22 in the non-facing portion 21Y of the negative active material layer 21 is set to 1.2 or higher. In other words, in the non-facing portion 21Y most of the flat-shaped negative active material particles 22 are oriented at a large angle, close to 90°, i.e., in standing position, with respect to the copper foil 28. Accordingly, in Examples 1 to 5, the negative active material particles 22 in the non-facing portion 21Y can prevent the retained electrolyte 51 from being pushed out of the electrode body 10 during high-rate charge and discharge of each battery (battery 1).

In the case of the battery containing the stored electrolyte as in the present embodiment, it is possible to restrain the retained electrolyte 51 having a high lithium ion concentration from being pushed out of the electrode body 10 during high-rate discharge, thereby preventing a gradual decrease in lithium ion concentration of the retained electrolyte 51. This makes it possible to achieve the batteries (battery 1) of Examples 1 to 5 configured to restrain an increase in internal resistance even when high-rate discharge is repeated.

In addition, the inventors of the present application subjected the batteries of Examples 1 to 5, Referential Example, and Comparative examples 1 to 4 to a charge test for short time using a relatively large current under a low temperature (−15° C.) environment, and checked a capacity change in each battery after the test.

A battery capacity of each battery 1 was first measured. To be concrete, a battery 1 in a charge state adjusted to SOC 100% in advance was subjected to constant current discharge at a current of ⅓ C under a temperature environment of 25° C. until 3.0 V was reached, and then a battery capacity after discharge was measured. The battery capacity obtained at that time is assumed as an untested (before-test) capacity C1.

After the measurement of battery capacity, the battery 1 charged to SOC40% was subjected to charge for 0.1 second at a current of 30 C (low-temperature short charge) and discharge for 10 seconds at a current of 0.3 C (capacity regulating discharge), which were assumed as one cycle and repeated by 5000 cycles under a temperature environment of −15° C. A halt or break period of 30 seconds was placed between the cycles.

Thereafter, a battery capacity value (a posttest (after-test) battery capacity C2) of the battery 1 was measured by the aforementioned method. By using the untested battery capacity C1 and the posttest battery capacity C2, a capacity retention rate of the battery 1 before and after the test (i.e., a percentage (%) of a value calculated by dividing the posttest battery capacity C2 by the untested battery capacity C1) was calculated.

The capacity retention rate of each battery of Examples 2 to 5, Referential Example, and Comparative examples 1 to 4 was measured (calculated) in the same manner as the above method on the battery 1. The capacity retention rate of each battery of Examples 2 to 5, Referential Example, and Comparative examples 1 to 4 are also listed in Table 1.

In Table 1, the battery having a capacity retention rate of 99.90% or more, that is, the battery having a battery capacity hardly decreases before and after the test performed by repeating low-temperature short charge is evaluated with a mark "O" and the battery having a capacity retention rate of less than 99.90% is evaluated with a mark "X".

According to Table 1, regarding the capacity retention rate, the battery of Referential Example is evaluated as being bad (X), while each of the batteries of Examples 1 to 5 is evaluated as being good (O). This result reveals that each battery of Examples 1 to 5 having the facing portion orientation degree AL2 set to 0.8 or less hardly decreases in battery capacity before and after the low temperature short charge even when this charge is repeated.

Graphite particles have a (micaceous) crystal structure in which a plurality of basal planes each consisting of carbon atoms arranged in planar form are laminated, and take a flat-shaped particle form having main front and back faces parallel to the basal planes. In the flat-shaped graphite particles, specifically, most of the main faces (front and back faces) are conceived as being parallel to the basal planes. Accordingly, the facing portion orientation degree AL2 in the facing portion is set to 0.8 or less to orient the flat-shaped negative active material particles 22 in lying position with respect to the copper foil 28, so that the projecting area of the basal planes of graphite seen from the positive electrode sheet 30 can be made larger and the negative active material particles 22 can receive more lithium ions through the basal planes. Therefore, it is conceived that lithium ions can be inserted appropriately in the negative active material particles 22 when a large current (30 C) is charged for 0.1 second under a low temperature environment (−15° C.) and deposition of lithium metal in the negative active material layers 21 can be restrained.

Of the batteries in the present embodiment, each battery (battery 1) of Examples 1 to 5 is configured so that the facing portion orientation degree AL2 of the negative active material particles 22 in the facing portion 21X of the negative active material layers 21 is set to 0.8 or less. Specifically, the facing portion 21X contain more flat-shaped negative active material particles 22 having a small angle close to 0°, i.e., in lying position, with respect to the copper foil 28 than that in the non-facing portion 21Y Therefore, the batteries (battery 1) of Examples 1 to 5 configured to prevent deposition of lithium metal under a low temperature environment (−15° C.) can be achieved.

Figure 6:
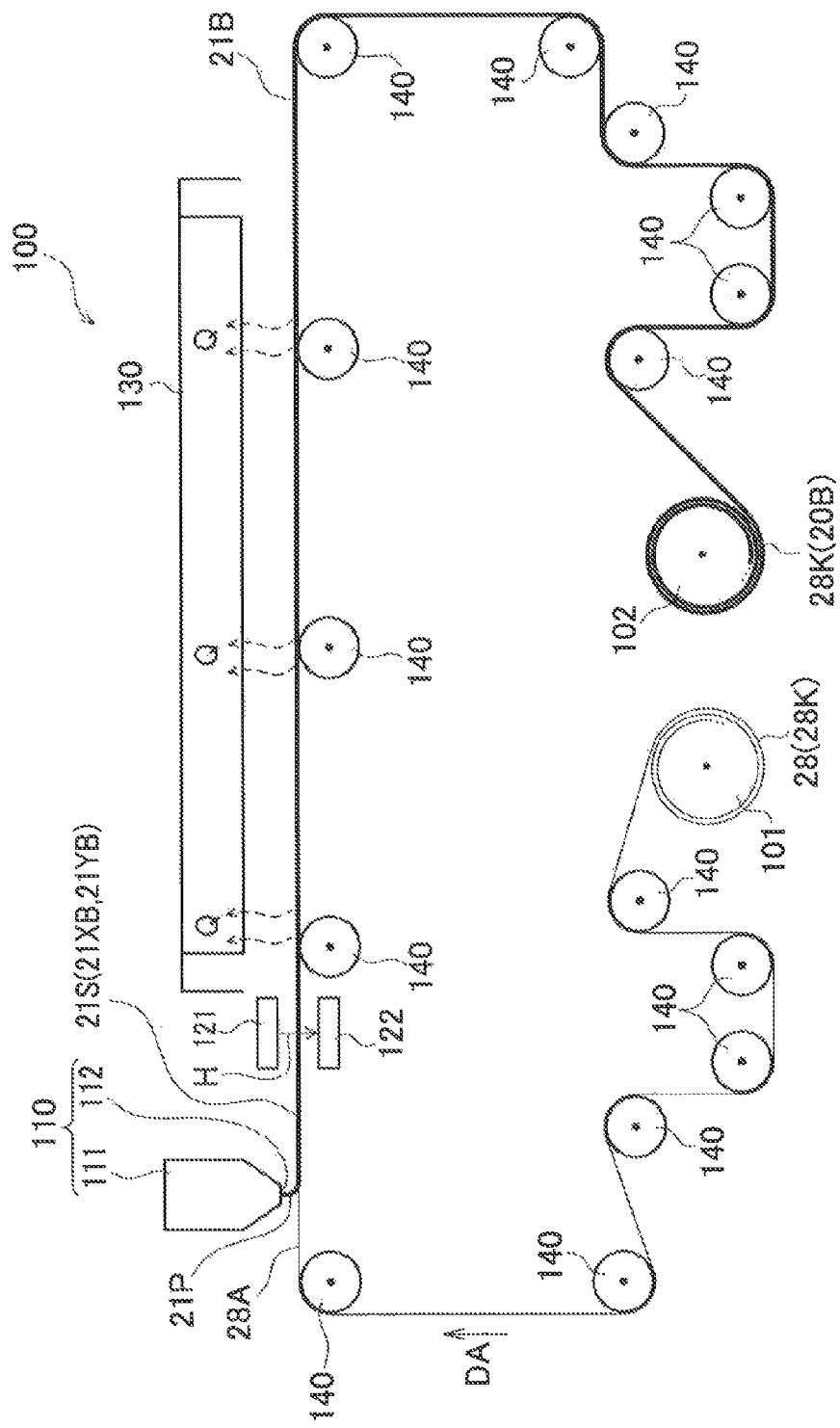
FIG. 6 is an explanatory diagram showing a method for manufacturing the lithium ion secondary batteries in the embodiment (Example 1) and the modified example.
Figure 7:
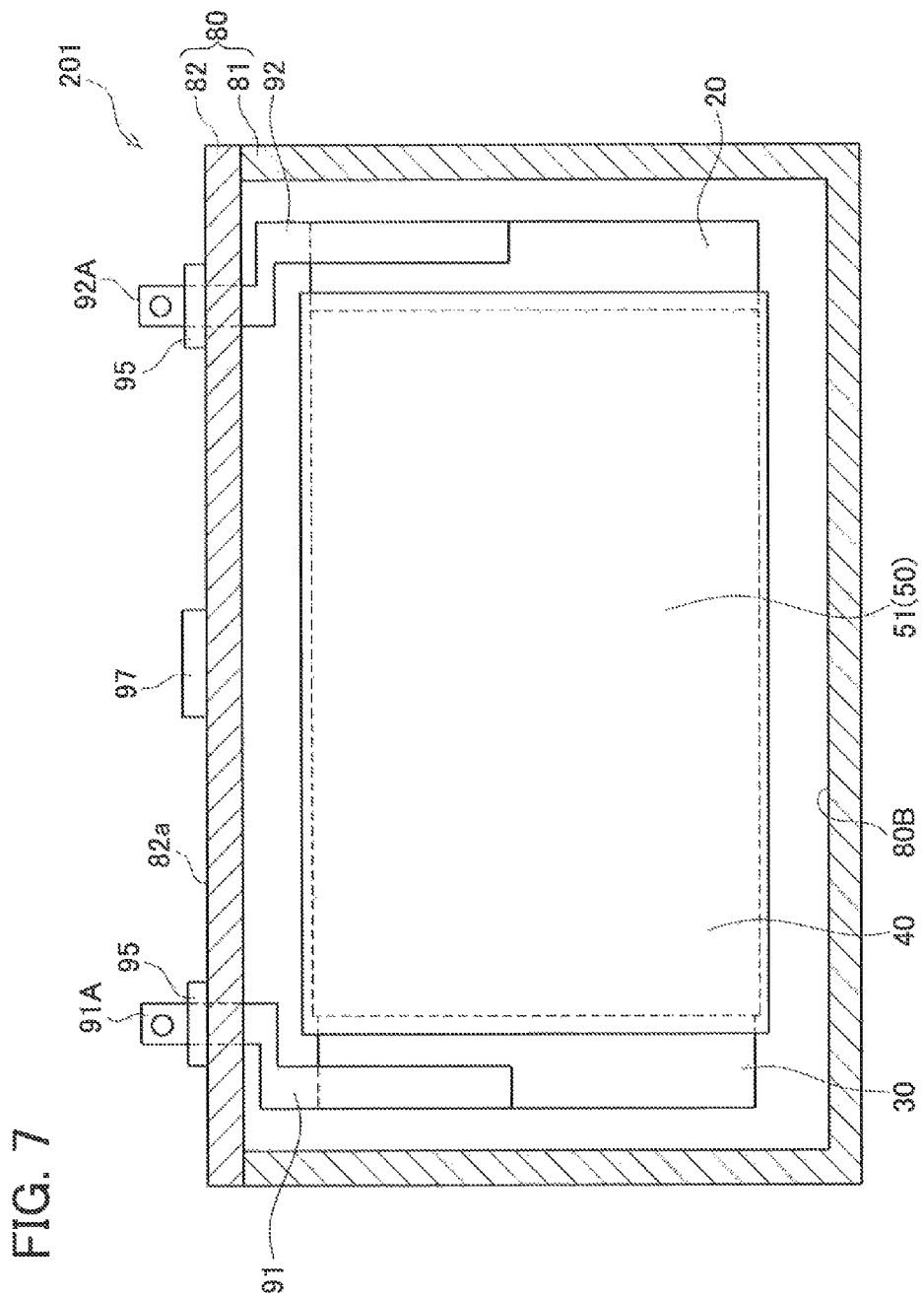
FIG. 7 is a cross sectional view (taken along the line A-A in FIG. 1) of the lithium ion secondary battery in the modified example.

Next, a method for manufacturing the battery 1 of Example 1 of the batteries of the present embodiment will be explained. The negative electrode sheet 20 is first produced. To produce this negative electrode sheet 20, an apparatus shown in FIG. 6 is used. This apparatus 100 includes a reel-out section 101, a coater 110, a magnetic circuit including magnets 121 and 122, a drying machine 130, a reel-in section 102, and a plurality of auxiliary rollers 140.

The coater 110 includes a paste hopper 111 made of metal which internally stores active material paste 21P and an ejection port 112 for continuously ejecting the active material paste 21P from the paste hopper 111 toward the foil main surface 28A of the copper foil 28.

The magnetic circuit is placed between the coater 110 and the drying machine 130 mentioned later. This magnetic circuit is configured so that the first magnet 121 and the second magnet 122 are placed to face the foil main surfaces 28A of the copper foil 28 from above and below the foil main surfaces 28A. These first magnet 121 and second magnet 122 can generate therebetween magnetic field H going from the first magnet 121 to the second magnet 122 (from above to below in FIG. 6). Specifically, the magnetic field H can be applied to a coating 21S placed between the magnets 121 and 122 in a direction perpendicular to the coating 21S.

Furthermore, the drying machine 130 is an existing infrared drying machine and is configured so that the internal atmosphere is interchanged by natural convection. By use of this drying machine 130, the copper foil 28 and the coating 21S made of the active material paste 21P applied to the copper foil 28 are heated and dried without blowing air. Accordingly, the coating 21S applied to the copper foil 28 is gradually dried while moving under this drying machine 130 (a lower side in FIG. 6). At the time when passing through the drying machine 130, the coating 21S is completely dried, that is, the solvent Q contained the coating 21S is fully evaporated.

Firstly, the active material paste 21P is prepared by dispersing the aforementioned negative active material particles 22, CMC, and SBR in the solvent Q. This active material paste 21P is stored in the paste hopper 111 of the coater 110.

The strip-shaped copper foil 28 wound around the reel-out section 101 is reeled out in the longitudinal direction DA, and the active material paste 21P is applied to one of the foil main surfaces 28A of the copper foil 28 by the coater 110. The active material paste 21P applied to the copper foil 28 forms the coating 21S on the foil main surface 28A and will be subjected to a next orientation step.

Secondly, in the orientation step, using the aforementioned magnetic circuit, the magnetic field H is applied to a prospective non-facing portion (which will be a non-facing portion) 21YB of the coating 21S (see FIG. 6). To be concrete, by use of the first magnet 121 and the second magnet 122 forming the magnetic circuit, the magnetic field H (a magnetic flux density of 50 mT) is applied to the prospective non-facing portion 21YB corresponding to the circumferential end portion of the coating 21S located between the magnets 121 and 122 to make magnetic field orientation of the negative active material particles 22 contained in the prospective non-facing portion 21YB.

It is to be noted that the magnetic field H is not applied to a prospective facing portion (which will be s a facing portion) 21XB corresponding to a center part of the coating 21S. Accordingly, of the negative active material particles 22, the negative active material particles 22 contained in the prospective facing portion 21XB are not subjected to magnetic field orientation.

After the above orientation step, a drying step is performed using the drying machine 130 to dry the coating 21S without blowing air thereto (see FIG. 6). Specifically, if the negative active material particles 22 in the prospective non-facing portion 21YB, magnetic-field oriented in the orientation step, are exposed to blowing hot air, the negative active material particles 22 in standing position by the magnetic field orientation may be moved, e.g., tilted, by the air blowing thereto. Therefore, while the coating 21S is dried without blowing air to restrain movement of the negative active material particles 22, the solvent Q is evaporated from the coating 21S. Accordingly, an uncompressed active material layer 21B holding the orientation of the negative active material particles 22 in the coating 21S is formed. Thereafter, a one-side carrying copper foil 28K carrying this uncompressed active material layer 21B on one of the foil main surfaces 28A is reeled once on the reel-in section 102.

Subsequently, by using the apparatus 100 again, the active material paste 21P is also applied to the other foil main surface 28A of the above one-side carrying copper foil 28K (copper foil 28), thus forming the coating 21S on the foil main surface 28A. By using the above magnetic circuit (first magnet 121 and second magnet 122), the magnetic field H is applied to the prospective non-facing portion 21YB of the coating 21S, thereby making magnetic field orientation of the negative active material particles 22 of the prospective non-facing portion 21YB, and then the coating 21S is fully dried without blowing air by the drying machine 130. Thus, an active material lamination sheet 20B before press is produced in which the uncompressed active material layers 21B are formed on both foil main surfaces 28A, 28A of the copper foil 28 in lamination structure.

Thereafter, by using a roll press not shown, the above active material lamination sheet 20B is compressed, producing the negative electrode sheet 20 having the aforementioned negative active material layers 21 (see FIG. 3). At that time, the active material lamination sheet 20B is compressed by pressure at such a level as not to disturb the magnetic field orientation of the negative active material particles 22 of the uncompressed active material layers 21B.

On the other hand, a paste (not shown) prepared by adding positive active material particles ($LiNi_{1/3}Co_{1/3}Mn_{1/3}O_2$ not shown) and a conductive material (AB not shown) to a solvent having therein a binding material (PVDF not shown) dissolved, and then kneading this mixture, is applied to both surfaces of a strip-shaped aluminum foil (not shown) and then dried. The dried paste is compressed by the roll press not shown. The positive electrode sheet 30 having the positive active material layers (not shown) thus produced.

The separators (not shown) are interposed between the positive electrode sheet 30 and the negative electrode sheet 20 produced as above and wound together to form the electrode body 10. Furthermore, the positive current collecting member 91 and the negative current collecting member 92 are respectively welded to the positive electrode sheet 30 and the negative electrode sheet 20. This assembly is inserted in the case body 81. The electrolyte 50 is poured in the case body 81 and then the closing lid 82 is welded to the case body Si to close it. In this way, the battery 1 is completed (see FIGS. 1 and 2).

Of the batteries of the present embodiment, the batteries of Examples 2 to 5 mentioned above are produced as with the battery 1 through the aforementioned applying step, orientation step, and drying step. Each battery of Examples 2 to 5 is produced so that the magnetic flux density of the magnetic field H in the orientation step is set different from that in Example 1 (50 mT), concretely; the distance between the first magnet 121 and the second magnet 122 is set different by example. The battery of Referential Example is produced by applying the magnetic field H to the prospective facing portion 21XB in addition to the prospective non-facing portion 21YB in the orientation step. In this way, the batteries of Examples 2 to 5 having the non-facing portion orientation degree AL1 and the facing portion orientation degree AL2 shown in Table 1 are completed.

In the orientation step of the manufacturing method of the batteries (battery 1) of Examples 1 to 5, the magnetic field H is applied to the prospective non-facing portion 21YB to make magnetic field orientation of the negative active material particles 22 of the prospective non-facing portion 21YB and further the coating 21S is dried in the drying step. Accordingly, the battery 1 can be easily manufactured with the non-facing portion orientation degree AL1 of the negative active material particles 22 in the non-facing portion 21Y of the negative electrode sheet 20 (negative active material layers 21) set to 1.2 or higher.

In the orientation step of the batteries (battery 1) of Examples 1 to 5, the magnetic field H is applied to the prospective non-facing portion 21YB, while the magnetic field H is not applied to the prospective facing portion 21XB. This makes it possible to easily and reliably manufacture the battery with the increased non-facing portion orientation degree AL1 of the non-facing portion 21Y without increasing the facing portion orientation degree AL2 of the facing portion 21X.

Modified Example

A modified example of the aforementioned embodiment will be explained below referring to the accompanying drawings. The batteries (each battery (battery 1) of Examples 1 to 5) of the above embodiment contain the stored electrolyte in addition to the retained electrolyte. On the other hand, a lithium ion secondary battery of this modified example differs from the above embodiment in that the electrolyte accommodated in the battery case is only the retained electrolyte retained in the electrode body, that is, this battery contains no stored electrolyte in the battery case. Other parts are identical to those in the above embodiment.

In a battery 201 of the modified example, as with the batteries (battery 1 and others) of the above embodiment, the non-facing portion orientation degree AL1 of the negative active material particles 22 in the non-facing portion 21Y of the negative active material layers 21 is set to 1.2 or higher. Specifically, most of the flat-shaped negative active material particles 22 in the non-facing portion 21Y are oriented at a large angle, close to 90°, i.e., in standing position, with respect to the copper foil 28. Thus, the negative active material particles 22 in the non-facing portion 21Y can restrain the retained electrolyte 51 from being pushed out of the electrode body 10 during high-rate charge and discharge, thereby preventing a decrease in liquid amount of the retained electrolyte 51 retained in the electrode body 10. Accordingly, the battery 201 configured to restrain an increase in internal resistance associated with high-rate charge and discharge can be achieved.

Although the present invention is explained in the above embodiment (Examples 1 to 5) and the modified example, the invention is not limited to the above and may be embodied in other specific forms without departing from the essential characteristics thereof.

The above embodiment shows the drying step using infrared rays to heat the coating 21S and evaporate the solvent Q to dry the coating 21S. As an alternative, for instance, the drying method for drying the coating 21S may be performed by using electromagnetic induction heating (IH), condenser drier or heater using hot air. In the orientation step, the magnetic field H is applied by use of the magnetic circuit including the magnets, but may be applied by use of an electromagnet for example.

The invention claimed is:

1. A lithium ion secondary battery including:
an electrode body including:
    a negative electrode sheet including a negative metal foil and a negative active material layer formed on the negative metal foil, the negative active material layer containing negative active material particles;
    a positive electrode sheet including a positive metal foil and a positive active material layer formed on the positive metal foil; and
    separators interposed between the positive electrode sheet and the negative electrode sheet;
a battery case housing the electrode body; and
an electrolyte accommodated in the battery case, the electrolyte containing lithium ions,
the electrolyte including a retained electrolyte retained between the positive electrode sheet and the negative electrode sheet of the electrode body,
the negative active material layer having a facing portion placed to face the positive active material layer of the positive electrode sheet adjacent through the separators and a non-facing portion placed outside the facing portion on an outer circumferential side of the negative active material layer without facing the positive active material layer,
wherein the negative active material particles are flat-shaped particles containing graphite and being able to be oriented by a magnetic field,
in particle cross sections of 100 or more of the negative active material particles in a vertical cross section of the negative electrode sheet observed through a scanning electron microscope (SEM),
an angle formed between an extending direction of a major axis of the particle cross section and the negative metal foil is assumed as θ,
of the observed negative active material particles, a number of the negative active material particles having the angle θ of 60° to 90° is assumed as MA,
a number of the negative active material particles having the angle θ of 0° to 30° is assumed as MB, and
a value obtained by dividing the number MA by the number MB (=MA/MB) is assumed as an orientation degree AL of the negative active material particles,
the negative active material layer is configured such that a non-facing portion orientation degree AL1 which is the orientation degree AL of the negative active material particles in the non-facing portion is 1.2 or higher,
wherein the facing portion of the negative active material layer is configured such that a facing portion orientation degree AL2 which is the orientation degree AL in the facing portion is 0.8 or less.

2. A method for manufacturing a lithium ion secondary battery including:
an electrode body including:
    a negative electrode sheet including a negative metal foil and a negative active material layer formed on the negative metal foil, the negative active material layer containing negative active material particles;
    a positive electrode sheet including a positive metal foil and a positive active material layer formed on the positive metal foil; and
    separators interposed between the positive electrode sheet and the negative electrode sheet;
a battery case housing the electrode body; and
an electrolyte accommodated in the battery case, the electrolyte containing lithium ions,
the electrolyte including a retained electrolyte retained between the positive electrode sheet and the negative electrode sheet of the electrode body,
the negative active material layer having a facing portion placed to face the positive active material layer of the positive electrode sheet adjacent through the separators and a non-facing portion placed outside the facing portion on an outer circumferential side of the negative active material layer without facing the positive active material layer,
wherein the negative active material particles are flat-shaped particles containing graphite and being able to be oriented by a magnetic field,
in particle cross sections of 100 or more of the negative active material particles in a vertical cross section of the negative electrode sheet observed through a scanning electron microscope (SEM),
an angle formed between an extending direction of a major axis of the particle cross section and the negative metal foil is assumed as θ,
of the observed negative active material particles, a number of the negative active material particles having the angle θ of 60° to 90° is assumed as MA,
a number of the negative active material particles having the angle θ of 0° to 30° is assumed as MB, and
a value obtained by dividing the number MA by the number MB (=MA/MB) is assumed as an orientation degree AL of the negative active material particles,
the negative active material layer is configured such that a non-facing portion orientation degree AL1 which is the orientation degree AL of the negative active material particles in the non-facing portion is 1.2 or higher,
wherein, the method includes:
an applying step of applying active material paste containing the negative active material particles dispersed in a solvent to a main surface of the negative metal foil to form a coating;
an orientation step of applying a magnetic field to a prospective non-facing portion of the coating, which will be the non-facing portion of the negative active material layer, to orient the negative active material particles contained in the prospective non-facing portion by a magnetic field; and
a drying step of drying the coating after the orientation step,
wherein the facing portion of the negative active material layer is configured such that a facing portion orientation degree AL2 which is the orientation degree AL in the facing portion is 0.8 or less, and wherein the orientation step includes applying a magnetic field to the prospective non-facing portion without applying a magnetic field to a prospective facing portion which will be the facing portion of the negative active material layer.

* * * * *